(12) United States Patent
Brouwer et al.

(10) Patent No.: US 8,671,279 B2
(45) Date of Patent: Mar. 11, 2014

(54) INCREMENTAL SECURE BACKUP AND RESTORE OF USER SETTINGS AND DATA

(75) Inventors: Michael Lambertus Hubertus Brouwer, San Jose, CA (US); Mitchell D. Adler, Cupertino, CA (US); Gordon J. Freedman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/527,257

(22) Filed: Jun. 19, 2012

(65) Prior Publication Data

US 2012/0260099 A1 Oct. 11, 2012

Related U.S. Application Data

(62) Division of application No. 11/770,706, filed on Jun. 28, 2007, now Pat. No. 8,209,540.

(51) Int. Cl.
*H04L 9/32* (2006.01)
(52) U.S. Cl.
USPC ........... 713/176; 713/165; 713/180; 713/187; 707/646; 707/647; 707/679
(58) Field of Classification Search
USPC .......... 713/165, 176, 180, 193, 187; 707/640, 707/646, 647, 679, 681; 711/161, 162
See application file for complete search history.

(56) References Cited

U.S. PATENT DOCUMENTS

| | | | |
|---|---|---|---|
| 5,265,164 A * | 11/1993 | Matyas et al. | 380/30 |
| 5,367,698 A | 11/1994 | Webber et al. | |
| 5,537,585 A | 7/1996 | Blickenstaff et al. | |
| 5,559,991 A | 9/1996 | Kanfi | |
| 5,652,879 A | 7/1997 | Harris et al. | |
| 5,765,173 A * | 6/1998 | Cane et al. | 707/640 |
| 5,778,395 A | 7/1998 | Whiting et al. | |
| 5,813,009 A | 9/1998 | Johnson et al. | |
| 5,852,819 A | 12/1998 | Beller | |
| 5,946,700 A | 8/1999 | Pongracz et al. | |
| 5,974,238 A | 10/1999 | Chase | |
| 5,991,399 A | 11/1999 | Graunke et al. | |
| 6,023,708 A | 2/2000 | Mendez et al. | |
| 6,034,621 A | 3/2000 | Kaufman | |
| 6,049,874 A | 4/2000 | McClain et al. | |
| 6,101,507 A * | 8/2000 | Cane et al. | 707/999.201 |
| 6,108,687 A | 8/2000 | Craig | |
| 6,134,660 A * | 10/2000 | Boneh et al. | 713/193 |
| 6,178,403 B1 | 1/2001 | Detlef | |

(Continued)

FOREIGN PATENT DOCUMENTS

| | | |
|---|---|---|
| WO | WO 03/073292 | 9/2003 |
| WO | WO 03/088613 | 10/2003 |
| WO | WO 2008/085869 | 7/2008 |
| WO | WO 2009/023040 | 2/2009 |

OTHER PUBLICATIONS

Developer "Integrated Sync Services Into Your Application," Jun. 6, 2005, Google, pp. 1-4.

(Continued)

*Primary Examiner* — Philip Chea
*Assistant Examiner* — Shanto M Abedin
(74) *Attorney, Agent, or Firm* — Womble Carlyle Sandridge & Rice LLP

(57) ABSTRACT

Methods and apparatuses for performing secure incremental backup and restore operations are disclosed.

22 Claims, 7 Drawing Sheets

(56) References Cited

U.S. PATENT DOCUMENTS

| | | | |
|---|---|---|---|
| 6,269,405 B1 | 7/2001 | Dutcher | |
| 6,295,541 B1 | 9/2001 | Bodnar et al. | |
| 6,336,124 B1 | 1/2002 | Alam et al. | |
| 6,393,434 B1 | 5/2002 | Huang et al. | |
| 6,393,462 B1 | 5/2002 | Mullen-Schultz | |
| 6,430,576 B1 | 8/2002 | Gates et al. | |
| 6,513,050 B1 | 1/2003 | Williams et al. | |
| 6,542,906 B2 | 4/2003 | Korn | |
| 6,557,028 B2 | 4/2003 | Cragun | |
| 6,564,261 B1 | 5/2003 | Gudjonsson et al. | |
| 6,571,245 B2 | 5/2003 | Huang et al. | |
| 6,654,785 B1 | 11/2003 | Craig | |
| 6,708,221 B1 | 3/2004 | Mendez et al. | |
| 6,714,968 B1 | 3/2004 | Prust | |
| 6,721,871 B2 | 4/2004 | Piispanen et al. | |
| 6,789,258 B1 | 9/2004 | Zak, Jr. et al. | |
| 6,907,450 B1 | 6/2005 | Lautenbacher | |
| 6,975,727 B1 | 12/2005 | Vandergeest | |
| 6,983,365 B1* | 1/2006 | Douceur et al. | 713/165 |
| 6,985,912 B2 | 1/2006 | Mullins et al. | |
| 6,990,513 B2 | 1/2006 | Belfiore et al. | |
| 7,039,679 B2 | 5/2006 | Mendez et al. | |
| 7,085,835 B2 | 8/2006 | Bantz et al. | |
| 7,096,867 B2 | 8/2006 | Smith et al. | |
| 7,100,039 B2 | 8/2006 | Fisher et al. | |
| 7,188,193 B1 | 3/2007 | Getsin et al. | |
| 7,200,668 B2 | 4/2007 | Mak et al. | |
| 7,263,551 B2 | 8/2007 | Belfiore et al. | |
| 7,330,997 B1 | 2/2008 | Odom | |
| 7,345,671 B2 | 3/2008 | Robbin et al. | |
| 7,401,104 B2 | 7/2008 | Shah et al. | |
| 7,454,462 B2 | 11/2008 | Belfiore et al. | |
| 7,458,091 B1 | 11/2008 | Getsin et al. | |
| 7,478,170 B2 | 1/2009 | Ong et al. | |
| 7,483,929 B2 | 1/2009 | Kulkarni et al. | |
| 7,490,295 B2 | 2/2009 | Chaudhri et al. | |
| 7,502,922 B1 | 3/2009 | Amin et al. | |
| 7,506,010 B2 | 3/2009 | Kulkarni et al. | |
| 7,523,096 B2 | 4/2009 | Badros et al. | |
| 7,523,386 B2 | 4/2009 | Awada et al. | |
| 7,526,916 B2 | 5/2009 | Scherer et al. | |
| 7,580,946 B2 | 8/2009 | Mansour et al. | |
| 7,627,343 B2 | 12/2009 | Fadell et al. | |
| 7,633,076 B2 | 12/2009 | Huppi et al. | |
| 7,660,831 B2 | 2/2010 | Freedman | |
| 7,685,175 B2* | 3/2010 | Carroll et al. | 707/661 |
| 7,778,971 B2 | 8/2010 | Freedman et al. | |
| 8,099,605 B1* | 1/2012 | Billsrom et al. | 713/187 |
| 2001/0056425 A1 | 12/2001 | Richard | |
| 2002/0002680 A1* | 1/2002 | Carbajal et al. | 713/180 |
| 2002/0087632 A1 | 7/2002 | Keskar | |
| 2002/0116405 A1 | 8/2002 | Bodnar et al. | |
| 2002/0123325 A1 | 9/2002 | Cooper | |
| 2002/0124241 A1 | 9/2002 | Grey et al. | |
| 2003/0095096 A1 | 5/2003 | Robbin et al. | |
| 2003/0097579 A1 | 5/2003 | England et al. | |
| 2003/0126301 A1 | 7/2003 | Mason et al. | |
| 2004/0030852 A1* | 2/2004 | Coombs et al. | 711/162 |
| 2004/0054711 A1 | 3/2004 | Multer | |
| 2004/0054739 A1 | 3/2004 | Friend et al. | |
| 2004/0093342 A1 | 5/2004 | Arbo et al. | |
| 2004/0117636 A1 | 6/2004 | Cheng | |
| 2004/0139178 A1 | 7/2004 | Mendez et al. | |
| 2004/0143745 A1* | 7/2004 | Margolus et al. | 713/176 |
| 2004/0148375 A1 | 7/2004 | Levett et al. | |
| 2004/0153481 A1 | 8/2004 | Talluri | |
| 2004/0181580 A1 | 9/2004 | Baranshamaje | |
| 2004/0186916 A1 | 9/2004 | Bjorner | |
| 2004/0224638 A1 | 11/2004 | Fadell et al. | |
| 2004/0225731 A1 | 11/2004 | Piispanen et al. | |
| 2004/0225791 A1 | 11/2004 | Keskar et al. | |
| 2004/0236803 A1* | 11/2004 | Spiegeleer | 707/204 |
| 2005/0066169 A1* | 3/2005 | Kiehtreiber et al. | 713/170 |
| 2005/0125459 A1 | 6/2005 | Sutinen et al. | |
| 2005/0147130 A1 | 7/2005 | Hurwitz et al. | |
| 2005/0246398 A1* | 11/2005 | Barzilai et al. | 707/204 |
| 2005/0268307 A1 | 12/2005 | Gates et al. | |
| 2006/0005191 A1 | 1/2006 | Boehm | |
| 2006/0015818 A1 | 1/2006 | Chaudhri et al. | |
| 2006/0026218 A1 | 2/2006 | Urmston | |
| 2006/0059207 A1 | 3/2006 | Hirsch et al. | |
| 2006/0101082 A1 | 5/2006 | Agrawal et al. | |
| 2006/0130046 A1 | 6/2006 | O'Neill | |
| 2006/0179083 A1 | 8/2006 | Kulkarni et al. | |
| 2006/0206547 A1 | 9/2006 | Kulkarni et al. | |
| 2006/0248162 A1 | 11/2006 | Kawasaki | |
| 2006/0264206 A1 | 11/2006 | Taba et al. | |
| 2006/0288223 A1* | 12/2006 | Kiehtreiber et al. | 713/176 |
| 2007/0022155 A1 | 1/2007 | Owens et al. | |
| 2007/0027937 A1 | 2/2007 | McGrattan et al. | |
| 2007/0075965 A1 | 4/2007 | Huppi et al. | |
| 2007/0100913 A1* | 5/2007 | Sumner et al. | 707/204 |
| 2007/0118570 A1 | 5/2007 | Wang | |
| 2007/0124331 A1 | 5/2007 | Griffin | |
| 2007/0203955 A1 | 8/2007 | Pomerantz | |
| 2007/0271317 A1 | 11/2007 | Carmel | |
| 2007/0271505 A1 | 11/2007 | Dandekar et al. | |
| 2008/0010286 A1 | 1/2008 | Zhang et al. | |
| 2008/0033950 A1 | 2/2008 | Lemay et al. | |
| 2008/0154989 A1 | 6/2008 | Arman | |
| 2008/0163743 A1 | 7/2008 | Freedman | |
| 2008/0168072 A1 | 7/2008 | Freedman | |
| 2008/0168106 A1 | 7/2008 | Freedman | |
| 2008/0168126 A1 | 7/2008 | Freedman | |
| 2008/0168184 A1 | 7/2008 | Freedman | |
| 2008/0168291 A1 | 7/2008 | Freedman | |
| 2008/0168292 A1 | 7/2008 | Freedman | |
| 2008/0229142 A1 | 9/2008 | Anand et al. | |
| 2008/0250085 A1 | 10/2008 | Gray et al. | |
| 2008/0307102 A1 | 12/2008 | Galloway | |
| 2008/0318550 A1 | 12/2008 | De Atley | |

OTHER PUBLICATIONS

Egidi, Lavinia et al., "From Digital Audiobook to Secure Digital Multimedia-Book," ACM Computers in Entertainment, vol. 4, No. 3, Jul. 2006, pp. 1-19.

Google Browser Sync by Google Labs, 2006, obtained from the Internet at: http://web.archive.org/web/20060613024119 (as downloaded Jan. 13, 2010).

Google Browser Sync dates obtained from http://web.archive.org (as downloaded Jan. 13, 2010).

Jonsson, Andreas et al., "SyncML—Getting the Mobile Internet in Sync," Ericsson Review, No. 3; XP-002958500, 2001, 110-115.

Lockhart, Robert K. et al., "Specifications for Ir Mobile Communications (IfMC)," Version 1.; XP-002155443; Jan. 1, 1999, 29-44.

Na, Seungwon et al., "Design and Implementation of Sync Engine for Automatic Installation System of PDA Application Programs," Proceedings of the 2003 IEEE International Symposium on Computational Intelligence in Robotics and Automation, Jul. 16-20, 2003, Kobe, Japan, pp. 372-377.

Novik, Lev et al., Peer-to-Peer Replication in WinFS research. microsoft.com/pub/tr/TR-2006-78 Jun. 2006, 17 pages.

Sawchuk. A.A. et al., "From Remote Media Immersion to Distributed Immersive Performance," 2003 ACM SIGMM workshop on Experiental Telepresence, Nov. 2003, pp. 110-120.

Shalev, Ori et al., Predictive Log-Synchronization ACM SIGOPS Operating Systems Review, vol. 40, Issue 4, Oct. 2006, pp. 305-315.

Sync2it—Basic Concepts, obtained from the Internet at: http://www.sync2it.com/help/howitworks.html (as downloaded Jan. 13, 2010).

Sync2it dates obtained from the Internet at http://web.archive.org (as downloaded Jan. 13, 2010).

SyncML, "Building an Industry-Wide Mobile Data Synchronization Protocol," SyncML White Paper, Version 1.0, Jan. 2001, 14 pages.

Takatama, Hirokazu et al., "Intelligent SIP System for Mobile Internet," Intelligent Network Workshop 2001, May 8, 2001, Boston, MA, 11 pages comprising slide Nos. 1-22.

Rinard, Martin C., "An integrated synchronization and consistency protocol for the implementation of a high-level parallel programming language," Aug. 6, 2002, pp. 549-553, IEEE, pp. 549-553.

* cited by examiner

Backup

INCREMENTAL SECURE BACKUP AND RESTORE OF USER SETTINGS AND DATA

This application is a divisional of U.S. application Ser. No. 11/770,706 filed on Jun. 28, 2007 now U.S. Pat. No 8,209,540.

FIELD OF THE INVENTION

This invention relates generally to backup and restore operations on a data processing device. More particularly, the invention relates to a method and apparatus for performing secure incremental backup and restore operations on a data processing device.

BACKGROUND OF THE INVENTION

Whenever performing backup and restore operations, security is always a concern. This is particularly true whenever performing these operations over a computer network connection. Security is important because much of the data a user might want to backup may be sensitive or confidential.

Additionally, computer networks have limited bandwidth. Network service providers must pay per megabit for bandwidth utilization. Currently whenever a backup or restore operation is performed, it is performed on the entire data set and therefore requires a lot of bandwidth.

What is needed is a method to perform a backup only on the data that has changed (I.e., incrementally) since a previous backup operation in order to reduce bandwidth utilization. Additionally, such operations should be performed securely.

SUMMARY OF THE INVENTION

Methods and apparatuses for performing secure incremental backup and restore operations is disclosed where a data processing device receives a manifest from a previous backup operation and determines what files have changed by comparing the files to be backed up to the manifest. The data processing device then transforms and encrypts only the new and modified files, updates the manifest, signs the manifest and sends the encrypted files along with the signed manifest to a host data processing system for backup. The host then deletes the files not contained in the updated manifest to complete the backup process. Also disclosed is a secure restore operations where a signed manifest is received at a data processing device which performs a restore of the entire backup as a set to prevent any tampering if the manifest is validated using a digital signature. Computer readable media and various data processing systems are also disclosed.

BRIEF DESCRIPTION OF THE DRAWINGS

A better understanding of the present invention can be obtained from the following detailed description in conjunctions with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
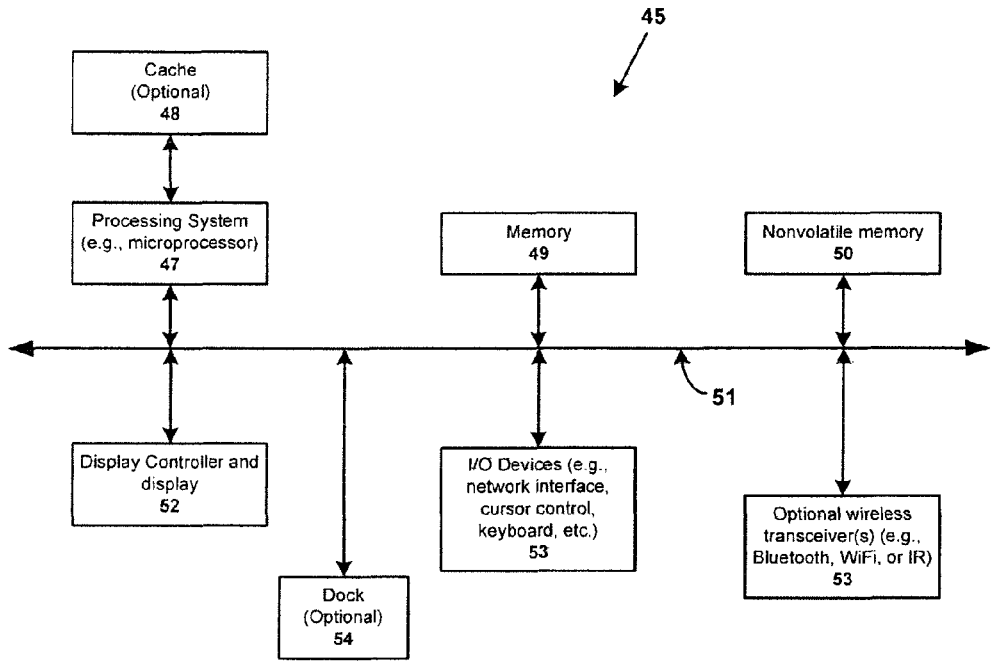
FIG. 1 illustrates a computer system according to one embodiment of he invention.
Figure 2:
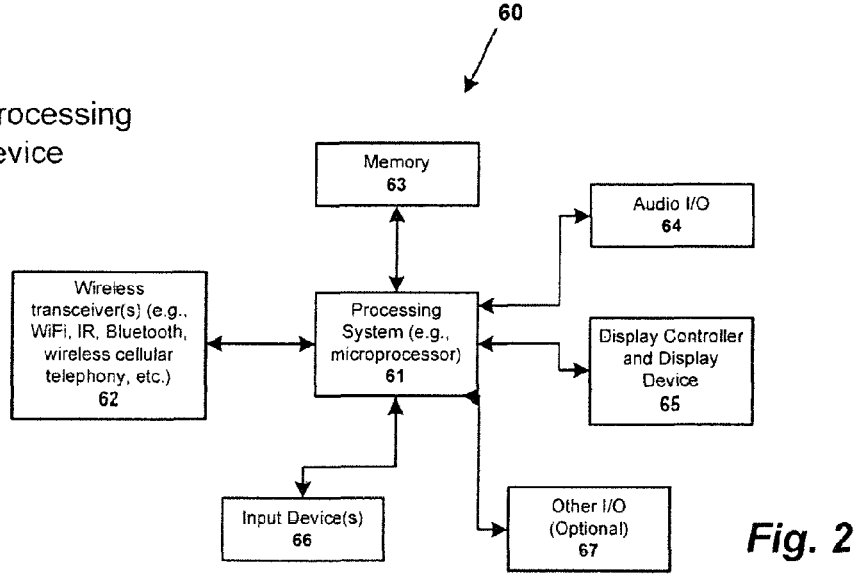
FIG. 2 illustrates a data processing system according to one embodiment of the invention.

Prior to describing the various different embodiments in connection with incremental secure backup and restore architectures, methods and computer readable media, a brief discussion will be provided in connection with the data processing devices which may be part of the backup and restore process. The term "host" and the term "device" are intended to refer generally to data processing devices rather than specifically to a particular form factor for the host versus a form factor for the device. FIGS. 1 and 2 show examples of two different data processing devices, where the system shown in FIG. 1 may be referred to as a host while the system shown in FIG. 2 may be referred to as a device, although the system shown in FIG. 1 may be referred to as a device while the system shown in FIG. 2 may be referred to as a host.

FIG. 1 shows one example of a computer system which is a form of a data processing device. Note that while FIG. 1 illustrates various components of a computer system, it is not intended to represent any particular architecture or manner of interconnecting the components as such details are not germane to the present inventions. It will also be appreciated that personal digital assistants (PDAs), cellular telephones, media players (e.g. iPods), devices which combine aspects or functions of these devices (a media player combined with a PDA and a cellular telephone in one device), network computers, an embedded processing device within another device, and other data processing devices which have fewer components or perhaps more components may also be used to implement one or more embodiments of the present inventions and may be one or more of the data processing devices described herein. The computer system shown in FIG. 1 may, for example, be a Macintosh computer from Apple Inc. or a computer which runs the Windows operating software from Microsoft Corporation.

As shown in FIG. 1, the host computer system 45 includes a bus 51 which is coupled to one or more microprocessors which form a processing system 47. The bus 51 is also coupled to memory 49 and to a non-volatile memory 50, which may be a magnetic hard drive in certain embodiments, or flash memory in other embodiments. The bus is also coupled to a display controller and display 52 and one or more input/output (I/O) devices 53. Further, the bus is coupled to an optional dock 54 and to one or more wireless transceivers 55, which may be a Bluetooth transceiver or a WiFi transceiver or an infrared transceiver. It will be appreciated that the wireless transceivers 55 are optional as shown in FIG. 1. The processing system 47 may optionally be coupled to optional cache 48. The processing system 47 may include one or more microprocessors, such as a microprocessor from Intel or IBM. The bus 51 interconnects these various components together in a manner which is known in the art. Typically, the input/output devices 53 are coupled to the system through input/output controllers. The memory 49 may be implemented as dynamic RAM (DRAM) which provides fast access to data but requires power continually in order to refresh or maintain the data in the memory. The non-volatile memory 50 may be a magnetic hard drive or other non-volatile memory which retains data even after power is removed from the system. While FIG. 1 shows that the non-volatile memory 50 is a local device coupled directly to the rest of the components in the data processing device, it will be appreciated that other embodiments may utilize a non-volatile memory which is remote from a system, such as a network storage device, which is coupled to the data processing device through a network interface, such as a modem or an Ethernet interface. The bus 51, as is well known in the art, may include one or more buses connected to each other through various bridges, controllers, and/or adapters as is known in the art. In one embodiment, the I/O controller 53 may include a USB adapter for controlling USB peripherals and an IEEE-1394 controller for IEEE-1394 compliant peripherals.

It will be apparent from this description that aspects of the inventions may be embodied, at least in part, in software. That is, the techniques may be carried out in a computer system or other data processing device in response to its processor or processing system executing sequences of instructions contained in a memory, such as memory 49 or non-volatile memory 50 or the memory 63 shown in FIG. 2. In various embodiments, hardwired circuitry may be used in combination with the software instructions to implement the present inventions. Thus, the techniques are not limited to any specific combination of hardware circuitry and software nor to any particular source for the instructions executed by the data processing device. In addition, throughout this description, various functions and operations are described as being performed by or caused by software code to simplify description. However, those skilled in the art will recognize that what is meant by such expressions is that the functions result from execution of the code by a processing system.

The dock 54 and/or the wireless transceivers 55 provide a physical interface for coupling the data processing device shown in FIG. 1 to another data processing device, such as the data processing device shown in FIG. 2, or to another data processing device which resembles the system shown in FIG. 1. The dock 54 may be similar to a dock in the prior art, such as the dock 26, such that it provides both a mechanical and electrical connection between one data processing device and another data processing device to allow a backup and restore process to be performed between the two systems. In other embodiments, the wireless transceivers 55 may provide an electrical connection between the two systems for the purpose of a synchronization process without providing a mechanical connection between the two systems.

FIG. 2 shows an example of another data processing device which may backup and restore data with other data processing devices, such as the system shown in FIG. 1 or a system which is similar to that shown in FIG. 2. The data processing device 60 shown in FIG. 2 includes a processing system, which may be one or more microprocessors, or which may be a system on a chip integrated circuit, and the system also includes memory 63 for storing data and programs for execution by the processing system. The system 60 also includes an audio input/output subsystem 64 which may include a microphone and a speaker for, for example, playing back music or providing telephone functionality through the speaker and microphone. A display controller and display device 65 provide a visual user interface for the user; this digital interface may include a graphical user interface which is similar to that shown on a Macintosh computer when running OS X operating system software. The system 60 also includes one or more wireless transceivers, such as a WiFi transceiver, an infrared transceiver, a Bluetooth transceiver, and/or a wireless cellular telephony transceiver. It will be appreciated that additional components, not shown, may also be part of the system 60 in certain embodiments, and in certain embodiments fewer components than shown in FIG. 2 may also be used in a data processing device. The data processing device 60 also includes one or more input devices 66 which are provided to allow a user to provide input to the system. These input devices may be a keypad or a keyboard or a touch panel or a multi-touch panel. The data processing device 60 also includes an optional input/output device 67 which may be a connector for a dock, such as the dock 54 shown in FIG. 1. It will be appreciated that one or more buses, not shown, may be used to interconnect the various components as is well known in the art. The data processing device shown in FIG. 2 may be a handheld computer or a personal digital assistant (PDA), or a cellular telephone with PDA-like functionality, or a handheld computer which includes a cellular telephone, or a media player, such as an iPod, or devices which combine aspects or functions of these devices, such as a media player combined with a PDA and a cellular telephone in one device. In other embodiments, the data processing device 60 may be a network computer or an embedded processing device within another device, or other types of data processing devices which have fewer components or perhaps more components than that shown in FIG. 2.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

In certain embodiments, the data processing device 60 may be implemented in a small form factor which resembles a handheld computer having a tablet-like input device which may be a multi-touch input panel device which is integrated with a liquid crystal display. Examples of such devices are provided in U.S. patent application Ser. No. 11/586,862, filed Oct. 24, 2006, and entitled "AUTOMATED RESPONSE TO AND SENSING OF USER ACTIVITY IN PORTABLE DEVICES," which is assigned to the same assignee as the instant application. This foregoing application is hereby incorporated herein by reference.

In the following description, various software components which are used for both backup and restore operations are described. It will be understood that in at least certain embodiments, these various software components may be stored in the memory 49 and/or memory 50 shown in FIG. 1 for one type of data processing device, and in the case of a system such as that shown in FIG. 2, these various different software components may be stored in the memory 63 which may include volatile memory as well as non-volatile memory, such as flash memory or a magnetic hard drive. A backup according to one embodiment of the invention is performed by two processed—one running on the device, called the Backup Agent, and one running on a host computer, called the Backup Tool. The Backup Tool and the Backup Agent communicate, in this embodiment, over a communications link (described in U.S. patent application Ser. No. 11/760,686 filed on Jun. 8, 2007 and U.S. Ser. No. 11/767,447 filed on Jun. 22, 2007) and is secured through the use of cryptography and certificates.

Figure 3:
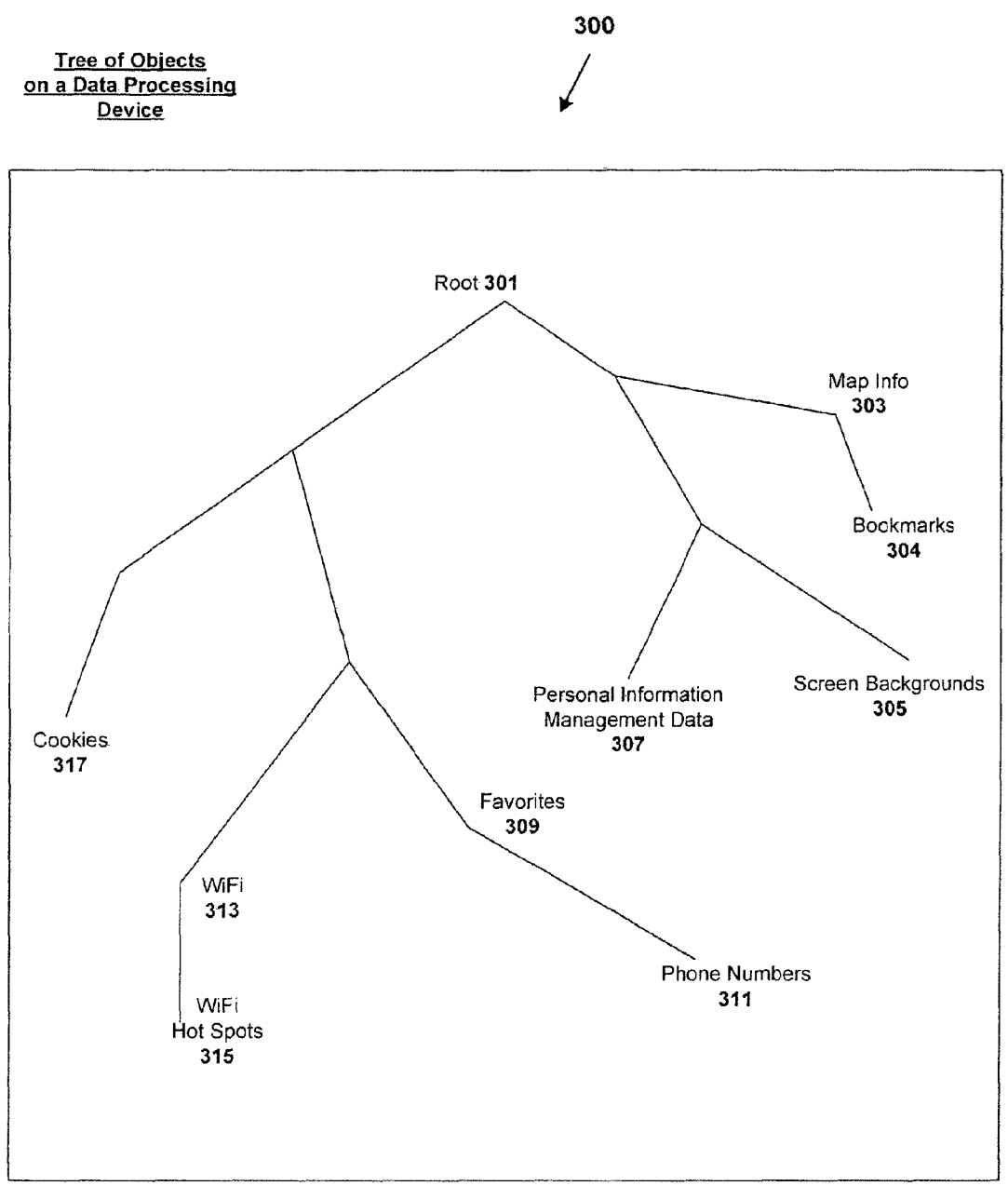
FIG. 3 illustrates a tree of objects stored on a data processing device according to one embodiment of the invention.

Referring now to FIG. 3, which illustrates tree of objects 300 which may be stored within a data processing device such as data processing device 60 according to one embodiment of the invention. Data processing device 60 is not limited to that data processing device depicted in FIG. 2, but may be any data processing device including host computer system 45 depicted in FIG. 1. Tree of objects 300 includes several nodes which may be accessed along branches which represent paths to each of the particular nodes. Each node represents an object. For example, if a node represents an object such as a file or group of files, then each branch represents the file path to the file or group of files from the root 301. That is, root 301 contained within tree of objects 300 is the node from which all files contained within tree of objects 300 may be accessed. In one embodiment, tree of objects 300, therefore, is a tree of files. Each node of the tree of objects is an object or other data structure which may include files, blocks, or other partitions of files or blocks stored on the data processing device. This information may be backed up and stored in a secure manner according to one embodiment of the invention. That is, the data objects and the paths (represented by branches in tree of objects) may be backed up onto a host computer which may be similar to host computer system of FIG. 1, data processing device 60 of FIG. 2 or other data processing devices commonly known in the art. Additionally, objects or other data structures backed up onto a host computer may be restored onto a data processing device, such as data processing device 60, in a secure fashion according to one embodiment of the invention.

From root 301, a user (not pictured) may access map info 303, screen backgrounds 305, personal information management data 307, favorites 309, WiFi 313, and cookies 317. Additionally, from map info 303 a user can access bookmarks 304. Bookmarks 304 may contain information relating to web sites frequently visited by the user or other similar information. Likewise from favorites 309, phone numbers 311 may be accessed, and from WiFi 313, WiFi hot spots 315 may be accessed by a user via root 301. Phone numbers 311 may include various phone numbers the user has stored in favorites 309. Likewise, WiFi hot spots 315 may contain a list of WiFi hot spots frequently visited by the user. Screen background 305 may contain a listing of the current screen background utilized by a data processing device as well as various other screen backgrounds previously utilized by the user. Personal information management data 307 may also be accessed and includes files and other data structures relating to managing the user's personal information. The files contained in FIG. 3 are by way of example only. The secure backup and restore scheme encompassed by the present invention applies to backing up and restoring any set of files.

As discussed above, information contained on a data processing device including files and other objects stored in tree of objects 300 may be securely backed up in an incremental manner onto a host computer such as that depicted in FIG. 1 or other such computer or data processing device known in the art. In fact, according to one embodiment of the invention, such data may be backed up in an incremental manner onto a computer or other data processing device that is not trusted. As will be discussed below, the host computer need not be trusted because the data backed up from a data processing device such according to one or more embodiments of this invention is both encrypted and signed.

Figure 4:
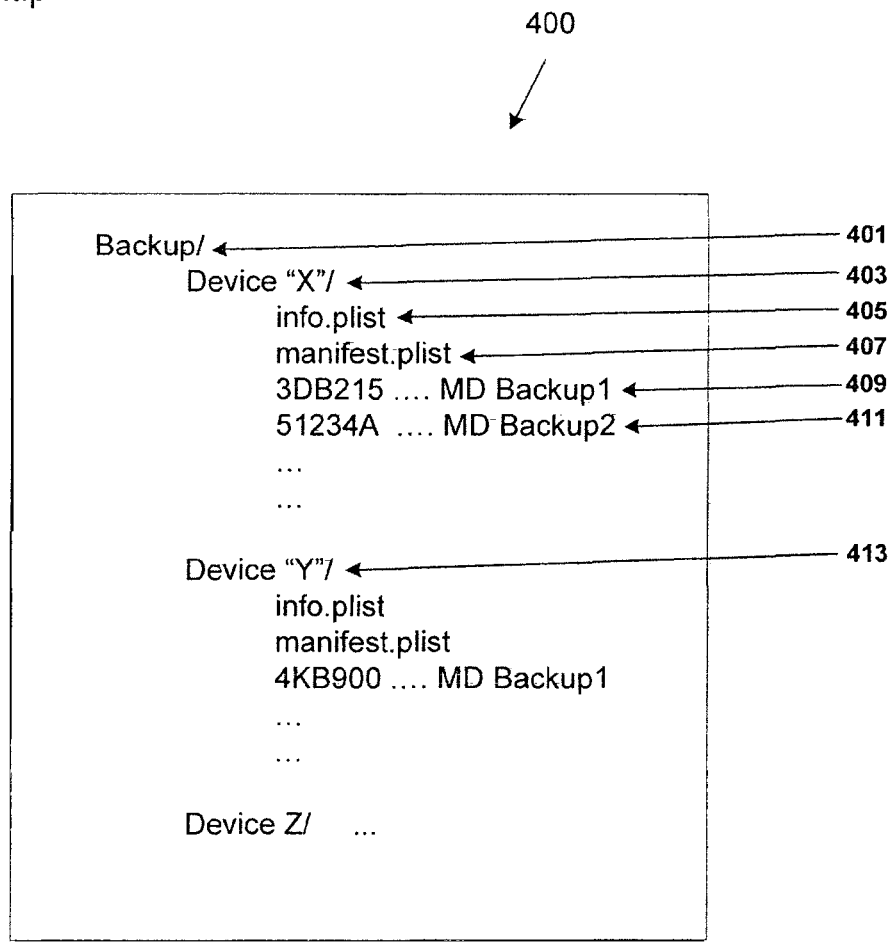
FIG. 4 illustrates a backup directory on a host computer according to one embodiment of the invention.

FIG. 4 illustrates backup 400 according to one embodiment of the invention. Backup 400 is a data structure, stored in a machine readable medium (e.g., a hard drive or a flash memory), which may be backed up on any computer or data processing device such as host computer 45 of FIG. 1. Backup 400 includes a backup directory 401. Backup directory 401 includes various sub-directories which may include backups from more than one device. As depicted in FIG. 4, for example, backup directory 401 includes Device "X" 403, Device "Y" 413, as well as other possible device backup directories corresponding to backup operations performed on other devices stored in backup directory 401. Each device has its own listing of files which, in one embodiment, may include info.plist 405, manifest.plist 407, and several backed-up files stored in backup directory 401 (i.e., MD Backup1 411, MD Backup2, 413, etc.). Info.plist 405 in this embodiment is an information file or object which may contain various implementation details such as device name, device identification, date of backup, additional settings, etc. Manifest.plist 407 in this embodiment represents a manifest file, object or other data structure which may contain various information relating to user settings and data stored within a host computer during a valid backup operation. In this embodiment, the manifest includes the following information: 1) a certificate; 2) a digital signature used to authenticate the backup; 3) a version used for version control; 4) one or more encrypted master encryption keys; and 5) a file map for each file stored as a part of the particular backup on the data processing device. In one embodiment, the file map information includes a mapping from the path hash (phash) to the contents hash (chash) of the file and other metadata information pertaining to the file. Such metadata information may include, for example, the modification date of the file being backed up. The phash is the hash of the path of the file to be backed up on a host computer and the chash is the hash of the contents of the file to be backed up (more about this later). That is, the file map contains at least the following mapping:

phash→(chash)

and alternatively, phash→(chash, mod date, other optional metadata)

In this embodiment, MD Backup1 411 is listed under its phash as the file name of the data as it is stored on the host. The reason the phash acts as the filename is so that the actual file name of the file will not be known to the host. That is, the host cannot tell which file corresponds to that particular backup entry. What's more, because the file path is hashed and used as the file name of the data stored on the host, the host has no way to determine which file relates to that particular manifest entry. As discussed above, this is advantageous because another person, such as a hacker, cannot determine this information without having access to the hash function. However, the hash function is stored on the device being backed up, such as data processing device 60, and is not accessible by the host. Therefore, the host has no way to determine which files have been backed up and no way to determine which files correspond to which entry. All the host can tell is the number of files that have been backed up as a set of opaque objects. MD Backup1 411, in this embodiment, is stored under phash 3DB215 which is the hash of the path to the actual file as it is stored on the data processing device, such as data processing device 60. That is, 3DB215 is the hashed path of the path to MD Backup1 411 as it is stored on Device "X" 405. MD Backup1 411 is the actual backed-up file on the host computer. However, MD Backup1 411 is the chash of the data stream sent to the host computer which is both transformed and encrypted. Thus, the file map entry represents a mapping from 3DB215 (the phash) to MD Backup1 411 (the chash of the data transformed and encrypted). MD Backup 1 411 is stored as a part of the backup of file1 in backup directory 403. Likewise, MD Backup2 412 is backed up in the same manner, the result of which, is a group of transformed and encrypted files which are hashed and stored under the file name of the phash of the file path. This provides security for the user in that the user's backed-up settings and data may not be inspected at the host computer. The user settings and data may only be inspected after it is restored onto the data processing device.

Figure 5:
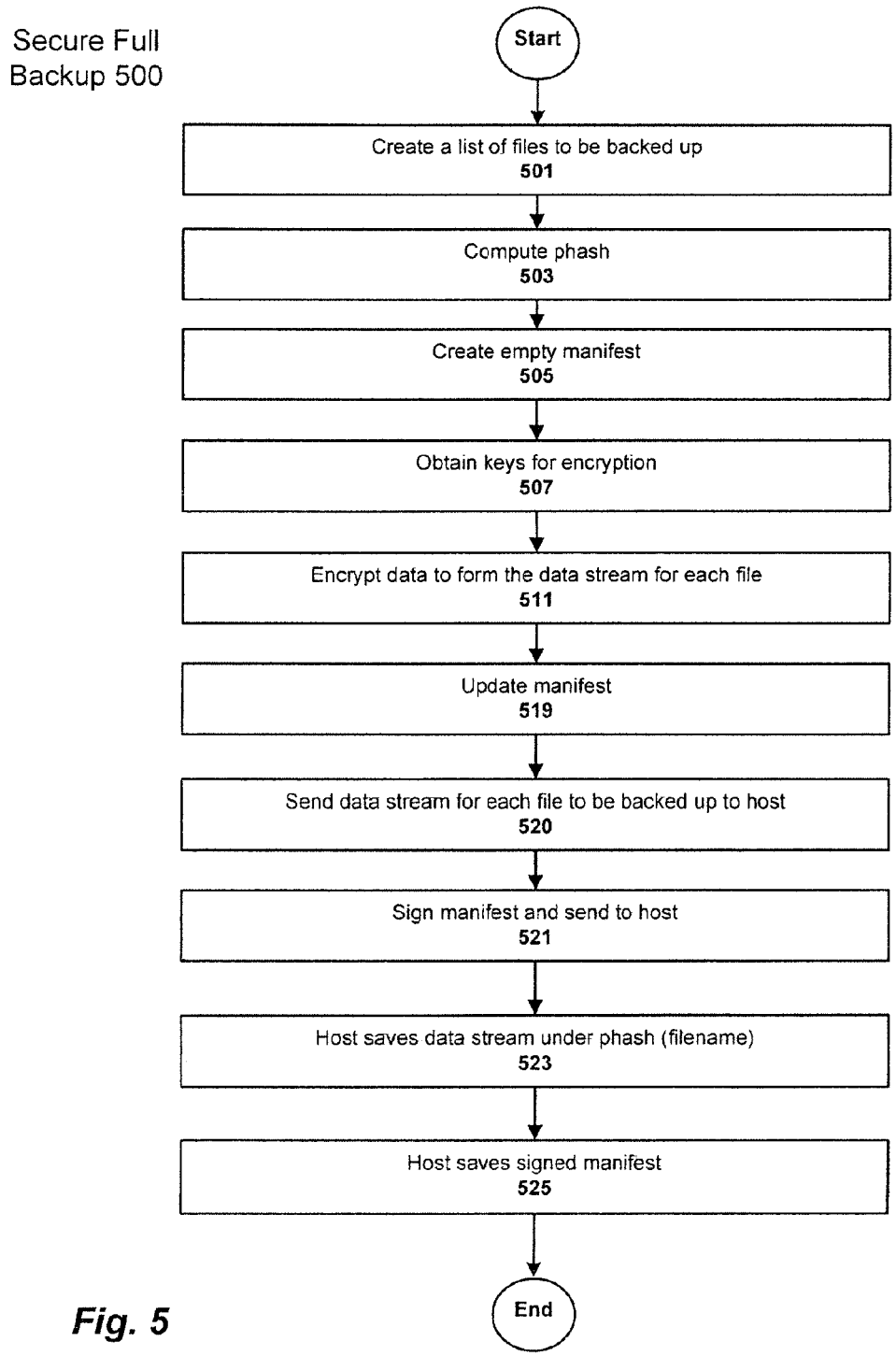
FIG. 5 illustrates a flow chart of a method for performing a secure full backup operation according to one embodiment of the invention.

As discussed above, a secure incremental backup may be performed on data such as that depicted in FIG. 3. However, an incremental backup can only be performed when there is an already existing backup stored on a particular host computer, such as one depicted in FIGS. 1. Whenever there is not a valid backup already stored on a host computer, a full backup operation must be performed. A secure full backup operation according to one embodiment of the invention is depicted in FIG. 5. Secure full backup 500 according to one embodiment starts at step 501 where the files to be backed up are determined. A data processing device, such as data processing device 60 walks files stored in a whitelist to create the list of safe files to be backed up. At Once the list of files to be backed up is determined, each file to be backed up is processed individually. At step 503, for each file to be backed the phash is computed by performing a hash operation on the file path relative to the home directory for each file to be backed up. The hashing function performed on the file paths of each file to be backed up may be a one-way hashing function or other hashing functions known in the art. When a one-way hashing function is used; however, some other person, such as a hacker, will not be able to determine the file path from the results of the one-way hash function. The information identifying the file path can only be reconstructed once the one-way hashing function is known. As discussed above, the one-way hashing function is stored at the data processing device and is not accessible to the host computer or on any network over which the data may travel.

In step 505, an empty manifest is created which will be updated as the backup process continues. Each time a new file is backed up, its file map will be placed in the manifest along with the other manifest information discussed above including certificate, signature, version and master encryption key(s). In step 507, the keys for encryption are obtained. For example a master encryption key (MEK) may be obtained according to one embodiment of the invention. The MEK may reside anywhere (all the algorithm requires is that there be a key to start the process). In this embodiment, the MEK is created with a random 16 byte value from a randomized algorithm stored in the /dev/random/directory on the data processing device. The MEK need only be generated once the first time a backup operation is performed. Also, the MEK need not be one key, but may be "n" keys for "n" different encryptions. The MEK(s), in this embodiment, are encrypted and stored in the manifest. An object encryption key may also be obtained to encrypt the individual objects to be backed up. In one embodiment, the objects are files, so a file encryption key (FEK) is obtained to encrypt the individual files. In this embodiment, each individual file is encrypted separately and sent over to the host computer. An advantage of this is that the files are backed up and encrypted individually so they may be encrypted with a unique FEK. Each file has its own key and there is a master key for each backup set. The master key does not change after a backup set is created unless a full backup is performed.

Accordingly, a FEK is generated for each file to be backed up on the data processing device. The FEK may be obtained from one of several algorithms known in the art. In this embodiment, the FEK is a random 16 byte value obtained from a randomized algorithm which is stored on the data processing device in /dev/random/directory. Similarly, an optional initialization vector (IV) to be used as part of the encryption process is obtained from a randomized algorithm which may be obtained from the /dev/random directory on the data processing device. An IV is a commonly known encryption method where there is some randomness added at the start of the data to keep hackers from figuring out the context of the data within an encryption scheme.

At step 511, the encryption is performed on the data for each file to be backed up. In this embodiment, the data is encrypted using the FEK on the file path concatenated with the contents of the file. That is, the file path is concatenated to the file bytes and then encrypted using the FEK according to the formula Encrypted Data=Enc{FEK, file path//file bytes}.

As mentioned above, each file or other object to be backed up has its own unique FEK in order to make it possible to do incremental backups of individual files. Once the data from the file is encrypted, the object encryption key is wrapped to form the wrapped object encryption key. In one embodiment, the objects are files and the FEK is wrapped to form the wrapped file encryption key (WFEK). The WFEK is obtained by encrypting the initialization vector concatenated with the FEK using the MEK. That is, the WFEK is obtained from the formula WFEK=Enc{MEK, IV//FEK}.

Once the data is encrypted the data stream for each file to be backed up may be formed. In one embodiment, the data stream is formed by concatenating the IV with the WFEK concatenated with the encrypted data for each individual file, That is, the data stream is obtained from the formula Data stream=IV//WFEK//encrypted data.

At step 519, the manifest is updated with the object map information for each object to be backed up. In this embodiment, the objects are files, so a file map is created. As discussed above, the file map includes at least a mapping from the phash of each file to the chash for each object to be backed up. The mapping may additionally be a mapping to other metadata germane to the backed up data such as modification date. However, this is just an implementation detail and is not intended to limit the invention. At step 520, once the manifest is updated, the data stream for the file to be backed up is sent to the host. Once all the data streams for each of the files to be backed up is sent to the host, the manifest is signed using a digital signature and sent to a host computer in step 521. The manifest is signed with the data processing device's activation certificate. The device's activation certificate is a part of a certificate chain of public and private keys that goes back to a trusted root. The certificate may be any certificate known in the art such as the standard X.509 certificate with standard signature. Once the host computer receives the data stream for each file to be backed up, the data stream is stored in the backup directory, similar to backup directory 401 under the data streams phash as the file name. Once the host receives and verifies the validity of the manifest, the manifest is also stored on the host in a file similar to manifest.plist 407 of FIG. 4. This completes the full backup operation and there exists a full backup of a user's settings and data that are stored on the data processing device at the time the backup was performed.

Figure 6:
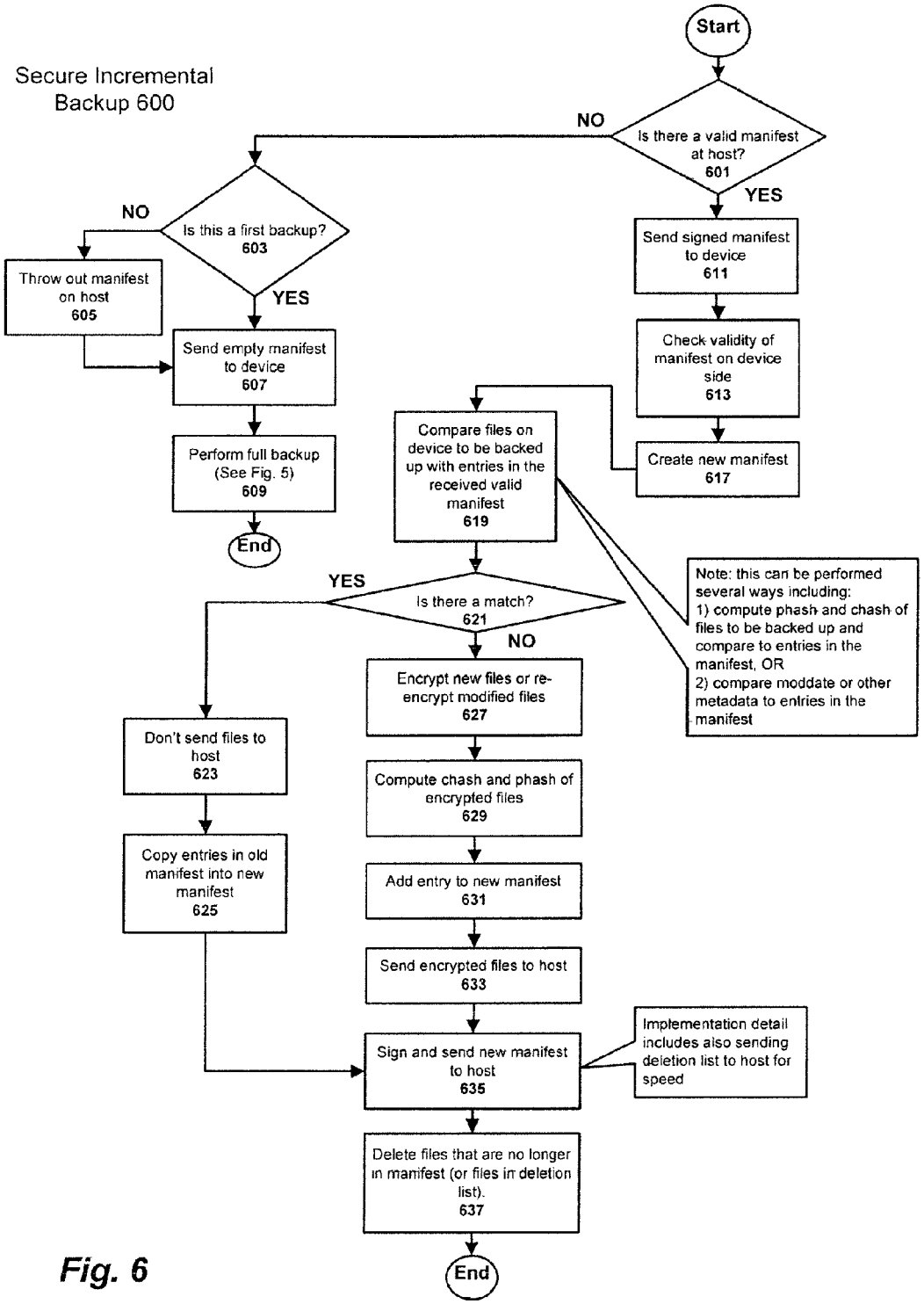
FIG. 6 illustrates a flow chart of a method for performing a secure incremental backup operation flow chart according to one embodiment of the invention.

Referring now to FIG. 6 which illustrates secure incremental backup 600 according to one embodiment of the invention. At step 601, it is determined whether there is a valid manifest at the host computer, such as host computer system 45, for example. If there is not a valid manifest, then it must be determined whether the backup operation is a first backup operation at step 603. If the backup operation is a first backup operation, an empty manifest is sent to the data processing device at step 607 and a full backup is performed (see FIG. 5) at step 609. If the backup is not a first backup, then the manifest must be invalid and is thrown out at step 605. An empty manifest is sent to the data processing device and a full backup is performed.

If there is a valid manifest stored at the host computer, the host computer sends the signed manifest to the data processing device at step 611. The data processing device checks the validity of the manifest at step 613 and fails the backup whenever the manifest received from the host is not valid. The data processing device knows whether the manifest has been validly signed because the signature originated from the device. At step 617, the data processing device creates a new manifest to replace the old valid manifest received from the host computer. The new manifest file is initially empty when created and is updated as the backup operation proceeds.

At step 619, every entry in the old manifest is compared to the files to be backed up currently stored on the data processing device to determine the delta between what files are represented in the old manifest and what files are currently stored on the data processing device. That is, each of the files to be backed up on the data processing device are compared to the entries in the old manifest to determine which files have changed, which files have been added, and which files have been deleted since the earlier backup corresponding to the manifest was performed. There are several ways in which this comparison can be made. In one embodiment, the phash and chash are computed for each file to be backed up and the results are compared to the entries in the manifest. Alternatively, the metadata for each file may be compared to the metadata in the old manifest. For, example the modification date of each file on the data processing device may be compared to the modification date in the old manifest. Files with the same modification date can be quickly determined to be the same files as existed on the data processing device at the time of the previous backup operation. Incremental backups can be really fast if it is predetermined that the file will never change without a concomitant change in the modification date. In this case, all that is needed to check whether a file has changed is to check the modification date. At step 621, for each file to be backed up on the data processing device, it is determined if there is a match between the file and an entry in the manifest. If there is a match, the file that has not changed since the backup corresponding to the old manifest was performed. In this case, control continues to step 623 and the files are not sent to the host because they have not been changed and there is no need to send them. At step 625, the data processing device simply copies the entry in the old manifest corresponding to the file that has remained unchanged into the new manifest and control continues to step 635. If there is not a match, then the file was either modified or added to the data processing device since the previous backup was performed. For example, files with different phash and chash values are either modified files or new files that have been added since the old manifest was generated during a previous backup. In such a case, control continues to step 627 where each of the new or modified files is encrypted and transformed. The phash and chash of each of the new or modified files is computed at step 629. At step 631, a new entry is added to the new manifest corresponding to the new or modified file and the encrypted files are sent to the host at step 633.

At step 635, the new manifest is signed with a digital signature using the device's activation certificate which is part of a certificate chain leading back to a trusted root and the manifest is sent to the host. Optionally, the data processing device may also send a list of deleted files to the host to speed up host-side processing, but this is just an implementation detail and is not required for this embodiment of the present invention. At step 637, the host receives the manifest and encrypted files and stores them together as a backup. The host then deletes the files which are not contained in the manifest by comparing the received manifest to the old manifest. Alternatively, the host computer deletes the files in the deletion list. This completes the secure incremental backup process according to one embodiment of the invention.

As discussed above, the incremental backup involves only sending the files that have changed over to the host computer. In this way, bandwidth utilization is minimized. As discussed above, in one embodiment of the invention the data processing device communicates with a host computer over a wireless network. Wireless networks today provide a limited bandwidth as compared to wired networks. As a consequence, bandwidth utilization comes at a premium. The present invention is advantageous in this regard in that secure backups may be performed incrementally alleviating the need to do a full backup every time. Thus, bandwidth utilization is minimized because only the files that have changed since the previous backup are sent across the wireless network to a host computer. Furthermore, an incremental backup may be performed much faster than a full backup.

Figure 7A:
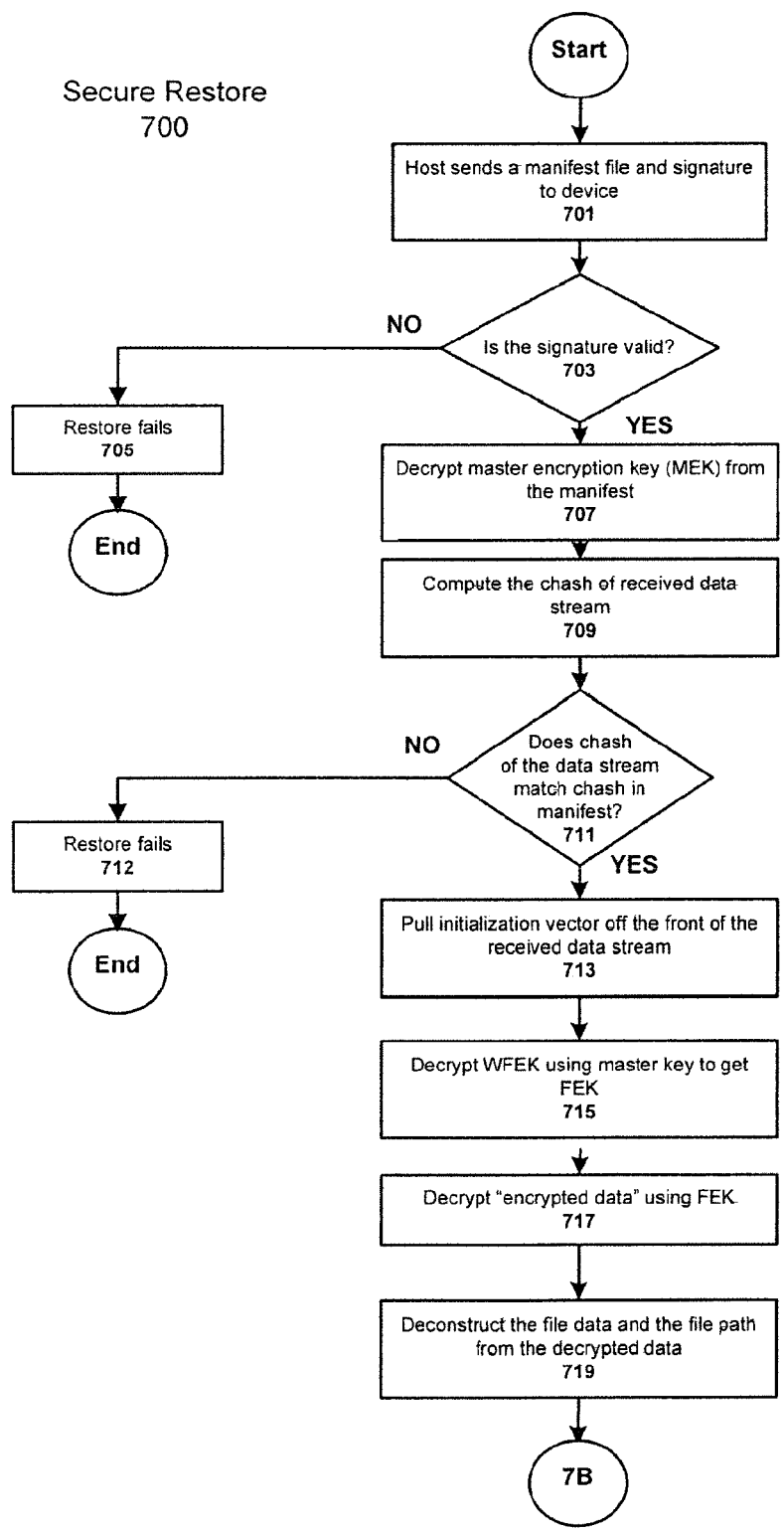
FIG. 7A illustrates a flow chart of the first part of a method for performing a secure restore operation according to one embodiment of the invention.

Referring now to FIG. 7A, which illustrates secure restore operation 700 according to one embodiment of the invention. A secure restore operation is performed to replace files that have been backed up at a host computer back onto the data processing device. This may be initiated in many ways and is an implementation detail. For example, the data processing device may request (via some sort of request signal) that the host send a backup to the device. Alternatively, there could be other policies and implementations that initiate the process of performing a secure restore. At step 701, the host sends the signed manifest to the data processing device. At step 703, the device receives the signed manifest and determines whether it is valid. As discussed above, the device generated the digital signature, so the device can determine whether the manifest is valid. If the manifest is not valid, control continues to step 705 and the restore fails. If the manifest is valid, control continues to step 707 where the data processing device decrypts the MEK stored in the manifest. Just as there are many ways to generate the MEK discussed above, there many ways to encrypt the MEK. The generating and encrypting of the MEK is an implementation detail and not meant to limit the present invention. In one embodiment, the MEK is encrypted using "Fairplay" (discussed in previous patents). As such, the MEK can be decrypted by any valid device, as the Fairplay encryption uses the same key for all devices.

At step 709, the chash of the received data stream. As discussed above, in one embodiment the data stream is obtained from the formula Data stream=IV//WFEK//encrypted data.

At step 711, the data processing device determines if the phash and chash of the data stream matches the phash and chash in the manifest. A file that hashes to phash that has the contents that hash to chash was a part of the backup set. If not, control continues to step 712 and the restore fails. If there is a match, control continues to step 713 where, in one embodiment, the IV is stripped off of the front of the received data stream. At step 715, the WFEK is decrypted using the MEK stored in the manifest to get the FEK for each file. Remember, each file that was backed up was encrypted with a unique FEK and any of the FEKs may be decrypted using the MEK. Once the WFEK is encrypted to get the FEK for each particular file, control continues to step 717, In this step, the FEK is used to decrypt the encrypted data which includes the file path concatenated with the file bytes. At step 719, the data processing device deconstructs the file path and the file data from the decrypted data. Control continues to FIG. 7B.

Figure 7B:
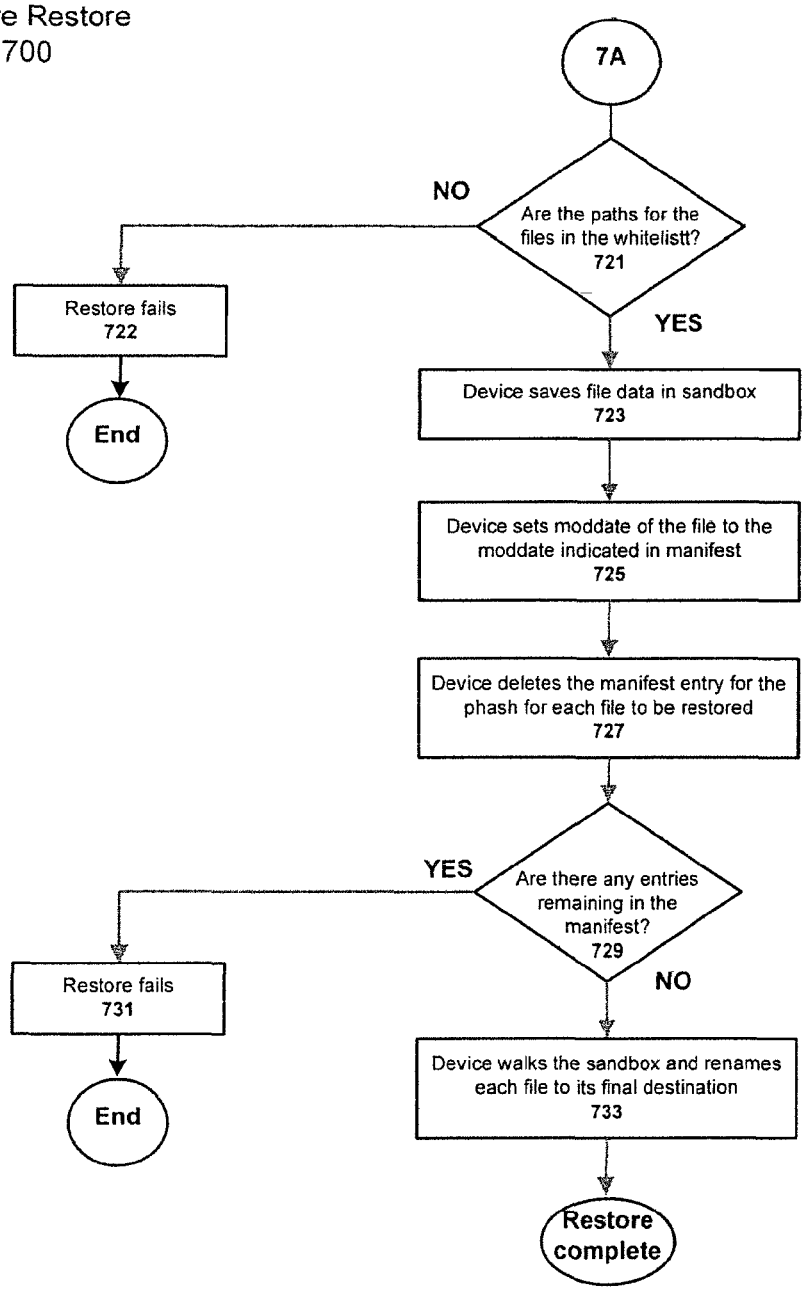
FIG. 7B illustrates a flow chart of the second part of a method for performing a secure restore operation according to one embodiment of the invention.

Referring to FIG. 7B, which illustrates a secure restore operation according to one embodiment of the invention. At step 721 the data processing device determines, for each file to be restored, whether the file path is in the whitelist of files maintained on the device. If not, control continues to 722 and the restore fails. If the file path is in the whitelist maintained on the data processing device, then control continues to step 723. In this step, the device saves the decrypted file data in a temporary file location, such as a sandbox. At step 725, the device sets the modification date of the file to the modification date indicated in the manifest. The device then deletes the manifest entry for the phash (file name) for each file being restored at step 727. At step 729, after all the files to be restored have been processed, the device determines if there are any entries remaining in the manifest. If there are remaining entries in the manifest, control proceeds to step 731 and the restore fails. Alternatively, the restore may continue and the additional entries are discarded. This is a policy choice of the data processing device backup software, such as Backup Agent. The importance of step 729 is to determine if there are entries in the manifest that were not in the data stream. In such a case, the entry is likely bogus and raises questions as to the security of the data backed up at the host computer. Alternatively, if the data stream ha more files than entries in the manifest, the data is likely bogus. In these cases, the data processing device software may chose to go ahead with the restore operation or may (under a strict security policy) discard the entire restore operation. As discussed above, this is a policy decision and may be affected by the type of data involved and/or the user's preferences. If, on the other hand, at step 729, there are no more entries in the manifest, then the restore operation may be presumed valid and control continues to step 733. In this step, the device commits the data stored in the temporary storage location to complete the restore operation. In one embodiment, the device may walk the sandbox and rename each file to its final destination. This completes the restore operation according to one embodiment of the invention.

As discussed above, the backup and restore operations of the present invention are done in a secure manner. Incremental secure backup and restore allows a user to make a backup of their user settings and data from a device and later restore the settings and data without fear that an attacker could introduce modified or additional files onto the device. This protects the device from any attacks which could cause applications to crash, behave unpredictably, or have their security compromised due to malformed data or configuration files. The secure feature of the present invention has two aspects. The first aspect is the prevention of inspection of the data sent to the host computer. The invention allows for the safe storage of the user's backup on their computer (or other host computer) in any encrypted form, that can be recovered onto any device the user allows to be restored. While stored on the computer, or stored on a server, the backup is unreadable as it is encrypted and can only be decrypted by a device when restored to a device with the proper software. Neither the host computer nor any other computer connected to the network that receives the backup from the data processing device can inspect its contents. The contents as transmitted and as stored on the host computer are stored as a set of opaque files. Both the files and the file path are encrypted when they are sent over the network and while they are stored on the host computer. So, not only is it not possible to tamper with the files, it is not possible to tamper with the file path or destination into which the file should be placed back onto the device and, as a result, it is not possible to tell which files were backed up. Additionally, the encrypted data is transformed and hashed (with a one-way hash in one embodiment) before it is sent over the network. Finally, the backup includes a manifest which is signed with a digital signature for authentication. The manifest is required to decrypt the data and the manifest and the data always go together as one backup set. Thus, the data is encrypted, transformed, hashed and signed before it is sent out onto the network and may not be inspected.

The second secure aspect is the tamper-proof aspect. In fact, it is possible to chose not to encrypt the data and have the backup still be tamper proof. That is because when a restore operation is performed, only the full set of files that were backed up may be restored. That is, the full set of files that came from the data processing device belong together and must be restored together. Piecewise restore operations are not permitted. It is not possible to mix and match files from different backups. For example, it is not possible to backup the old version of the address book with the new version of the calendar. Instead, the entire backup state of the device remains as a group. This is advantageous because it does not allow a person or party to attack the device by injecting files that should not be there, modifying files, or removing files from a backup set. It is only possible to restore a full backup set of files that resided together on the device. Another advantage of this is that it is even possible to back up files onto a machine or network that is not trusted and still be able to restore user settings and data onto the user's device without fear of tampering from another person or party. The user either gets the full set of files or nothing. In this way, the system of the present invention will catch all disk errors, mistakes by users, as well as attackers. In the case of files being injected into the backup by some other person or party, the present invention allows for policy choices as to whether to fail the entire backup or just reject the added files. In this case, the user may make a choice depending on the importance of the data and other factors.

Additionally, there is no limitation that the backup and restore be performed by the same data processing device. Alternate embodiments can encompass different mechanisms known in the art that allow a user to restore a backup onto a different device. This may be accomplished using a password or other certificate such as the device's activation certificate as long as the certificate is part of a chain leading back to a trusted root. For example, a password or other form of validation may be included to allow a user to restore data from a previous backup onto a different device. Thus, the algorithm is not device specific. This is advantageous because it allows, for example, a user with a broken device to purchase a new device and restore all the user's settings and data onto the new device. This is also advantageous from a business perspective because one of the barriers to purchasing a new data processing device such as a PDA is that a user does not want to have to manually enter all the user settings and data stored on the old data processing device. With PDAs and other handheld devices becoming more and more powerful, it is useful to be able to restore a user's settings and data onto a new device without manual entry.

Finally, the validity of a backup using a certified key can be verified without being able to restore the backup. The host computer can inspect the backup and tell if the backup set is valid without being able to inspect or restore the files.

Accordingly, the scope and spirit of the invention should be judged in terms of the claims which follow.

What is claimed is:

1. A method of performing a secure full backup of user settings and data, comprising:
   determining a set of objects to be backed up;
   creating a manifest including a master encryption key (MEK);
   encrypting, using an object encryption key (OEK), each object to be backed up, to form encrypted data;
   forming a data stream for each object to be backed up to be sent to a host data processing system;
   creating an object map for each object to be backed up, wherein creating the object map comprises:
      computing a path hash of the object to be backed up, computing a contents hash of the data stream for the object, and mapping the path hash to the contents hash for the object to be backed up;
   updating the manifest with the object map;
   sending the data stream for each object to be backed up to the host data processing system, wherein the host data processing system is configured to save the data stream under the object's respective path hash;
   signing the manifest with a digital signature for authentication; and
   sending the manifest to the host data processing system, wherein the host data processing system saves the signed manifest.

2. The method of claim 1, wherein determining the set of objects to be backed up comprises walking a whitelist.

3. The method of claim 1, wherein the encrypting each object to be backed up comprises:
   concatenating an object path with object bytes for each object to be backed up; and
   encrypting the object path concatenated with the object bytes using the OEK to form the encrypted data.

4. The method of claim 3, further comprising forming a wrapped object encryption key (WOEK), wherein forming the WOEK comprises:
   encrypting the MEK and saving the encrypted MEK in the manifest;
   obtaining an initialization vector (IV);
   concatenating the IV with the OEK; and
   encrypting the concatenated IV and OEK using the MEK.

5. The method of claim 4, wherein forming the data stream for each object to be backed up comprises:
   concatenating the IV with the WOEK; and
   concatenating the concatenated IV and WOEK with the encrypted data.

6. The method of claim 4, wherein the MEK is a 16 byte value obtained from a randomized algorithm.

7. The method of claim 3, wherein the OEK is a 16 byte value obtained from a randomized algorithm.

8. The method of claim 4, wherein the IV is obtained from a randomized algorithm.

9. The method of claim 1, wherein computing the path hash of the object comprises performing a hash function on a path of the object.

10. The method of claim 1, wherein the object is a file, and computing the path hash of the object comprises performing a hash function on a path of the file.

11. The method of claim 3, further comprising forming a wrapped object encryption key (WOEK), wherein forming the WOEK comprises:
   encrypting the MEK; and
   saving the encrypted MEK in the manifest.

12. A non-transitory computer-readable medium for a computer system, the non-transitory computer-readable medium having stored thereon a series of instructions executable by a processor to perform a secure full backup of user settings and data, the series of instructions comprising:
   instructions that cause the processor to determine a set of objects to be backed up;
   instructions that cause the processor to create a manifest including a master encryption key (MEK);
   instructions that cause the processor to encrypt, using an object encryption key (OEK), each object to be backed up, to form encrypted data;

instructions that cause the processor to form a data stream for each object to be backed up to be sent to a host data processing system;
instructions that cause the processor to create an object map for each object to be backed up, wherein the instructions that cause the processor to create an object map comprise:
  instructions that cause the processor to compute a path hash of the object to be backed up,
  instructions that cause the processor to compute a contents hash of the data stream for the object, and
  instructions that cause the processor to map the path hash to the contents hash for the object;
instructions that cause the processor to update the manifest with the object map;
instructions that cause the processor to send the data stream for each object to be backed up to the host data processing system, wherein the host data processing system saves the data stream under the object's respective path hash;
instructions that cause the processor to sign the manifest with a digital signature for authentication; and
instructions that cause the processor to send the manifest to the host data processing system, wherein the host data processing system saves the signed manifest.

13. The non-transitory computer-readable medium of claim 12, wherein the instructions that cause the processor to determine the set of objects to be backed up comprise instructions that cause the processor to walk a whitelist.

14. The non-transitory computer-readable medium of claim 12, wherein the instructions that cause the processor to encrypt each object to be backed up comprise:
  instructions that cause the processor to concatenate an object path with object bytes for each object to be backed up; and
  instructions that cause the processor to encrypt the object path concatenated with the object bytes using the OEK to form the encrypted data.

15. The non-transitory computer-readable medium of claim 14, further comprising instructions that cause the processor to form a wrapped object encryption key (WOEK), wherein the instructions that cause the processor to form the WOEK comprise:
  instructions that cause the processor to encrypt the MEK and save the encrypted MEK in the manifest;
  instructions that cause the processor to obtain an initialization vector (IV);
  instructions that cause the processor to concatenate the IV with the OEK; and
  instructions that cause the processor to encrypt the concatenated IV and OEK using the MEK.

16. The non-transitory computer-readable medium of claim 15, wherein the instructions that cause the processor to form the data stream for each object to be backed up comprise:
  instructions that cause the processor to concatenate the IV with the WOEK; and
  instructions that cause the processor to concatenate the concatenated IV and WOEK with the encrypted data.

17. The non-transitory computer-readable medium of claim 15, wherein the MEK is a 16 byte value obtained from a randomized algorithm.

18. The non-transitory computer-readable medium of claim 14, wherein the OEK is a 16 byte value obtained from a randomized algorithm.

19. The non-transitory computer-readable medium of claim 15, wherein the IV is obtained from a randomized algorithm.

20. The non-transitory computer-readable medium of claim 12, wherein the instructions that cause the processor to compute the path hash of the object comprise instructions that cause the processor to perform a hash function on a path of the object.

21. The non-transitory computer-readable medium of claim 12, wherein the object is a file, and the instructions that cause the processor to compute the path hash of the object comprise instructions that cause the processor to perform a hash function on a path of the file.

22. The non-transitory computer-readable medium of claim 14, further comprising instructions that cause the processor to form a wrapped object encryption key (WOEK), wherein the instructions that cause the processor to form the WOEK comprise:
  instructions that cause the processor to encrypt the MEK; and
  instructions that cause the processor to save the encrypted MEK in the manifest.

* * * * *

UNITED STATES PATENT AND TRADEMARK OFFICE
CERTIFICATE OF CORRECTION

PATENT NO.        : 8,671,279 B2    Page 1 of 1
APPLICATION NO.   : 13/527257
DATED             : March 11, 2014
INVENTOR(S)       : Michael Lambertus Hubertus Brouwer, Mitchell D. Adler and Gordon J. Freedman It is certified that error appears in the above-identified patent and that said Letters Patent is hereby corrected as shown below:

On the Title Page, Item (54) and in the Specification, Col. 1, Lines 1-2, the title is corrected to read as follows:

--SECURE BACKUP AND RESTORE OF USER SETTINGS AND DATA--

Signed and Sealed this
Twenty-fourth Day of June, 2014

Michelle K. Lee
*Deputy Director of the United States Patent and Trademark Office*